United States Patent
Kitamura et al.

(10) Patent No.: US 9,668,512 B2
(45) Date of Patent: Jun. 6, 2017

(54) CONTINUOUS FOOD FRYING DEVICE, CONTINUOUS FOOD FRYING METHOD, AND METHOD FOR PRODUCING FRIED FOOD

(71) Applicant: NICHIREI FOODS INC., Tokyo (JP)

(72) Inventors: Jiro Kitamura, Chiba (JP); Kimihiro Mori, Chiba (JP); Yoshito Fujimori, Chiba (JP); Kengo Uno, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 0 days.

(21) Appl. No.: 14/897,023

(22) PCT Filed: Jun. 9, 2014

(86) PCT No.: PCT/JP2014/065204
§ 371 (c)(1),
(2) Date: Dec. 9, 2015

(87) PCT Pub. No.: WO2014/199940
PCT Pub. Date: Dec. 18, 2014

(65) Prior Publication Data
US 2016/0120365 A1    May 5, 2016

(30) Foreign Application Priority Data

Jun. 10, 2013 (JP) ................. 2013-122069

(51) Int. Cl.
*A47J 37/04* (2006.01)
*A23L 5/10* (2016.01)
(Continued)

(52) U.S. Cl.
CPC ...... *A23L 5/12* (2016.08); *A23L 5/17* (2016.08); *A47J 37/044* (2013.01); *A47J 37/047* (2013.01);
(Continued)

(58) Field of Classification Search
CPC ............... A23L 5/11–5/12; A23L 5/17; A47J 37/12–37/1295; A47J 37/044–37/045; A47J 37/047
(Continued)

(56) References Cited

U.S. PATENT DOCUMENTS

| | | | | |
|---|---|---|---|---|
| 2,196,353 A | * | 4/1940 | Galban | A47J 37/1214 99/355 |
| 2,678,599 A | * | 5/1954 | Maddocks | A47J 37/1214 126/299 R |

(Continued)

FOREIGN PATENT DOCUMENTS

| | | |
|---|---|---|
| JP | H02-36824 A | 2/1990 |
| JP | H06-189855 A | 7/1994 |

(Continued)

OTHER PUBLICATIONS

Aug. 26, 2014 International Search Report issued in International Patent Application No. PCT/JP2014/065204.

*Primary Examiner* — Drew Becker
(74) *Attorney, Agent, or Firm* — Oliff PLC

(57) ABSTRACT

A continuous food frying device includes a first heating unit, a conveyance unit, a uniformizing unit, and a second heating unit. The first heating unit stirs and heats a food charged therein from a charging port of a drum member. The conveyance unit conveys a food discharged from a discharging port of the drum member. The uniformizing unit makes the thickness of the food substantially uniform. The second heating unit blows hot air onto the food from injection ports.

19 Claims, 3 Drawing Sheets

(51) Int. Cl.
*A47J 37/12* (2006.01)
*A47J 37/10* (2006.01)

(52) U.S. Cl.
CPC ......... *A47J 37/108* (2013.01); *A47J 37/1214* (2013.01); *A23V 2002/00* (2013.01)

(58) Field of Classification Search
USPC ....... 426/438–441, 523; 99/443 C, 404, 407, 99/409, 473–479
See application file for complete search history.

(56) References Cited

U.S. PATENT DOCUMENTS

| | | | | |
|---|---|---|---|---|
| 3,807,292 | A * | 4/1974 | Cinter | A47J 37/047 366/147 |
| 4,269,861 | A * | 5/1981 | Caridis | A23L 19/18 426/438 |
| 4,410,553 | A * | 10/1983 | McGinty | A47J 37/044 426/243 |
| 4,816,274 | A * | 3/1989 | Baisden | A23L 5/11 426/417 |
| 5,066,505 | A * | 11/1991 | Vos | A21B 5/08 426/438 |
| 5,132,133 | A * | 7/1992 | Huber | A21C 11/16 426/241 |
| 5,240,729 | A * | 8/1993 | Hamazaki | A23L 15/10 426/438 |
| 5,370,898 | A * | 12/1994 | Zussman | A23L 19/18 426/523 |
| 5,470,600 | A * | 11/1995 | Petelle | A47J 37/044 426/237 |
| 5,505,978 | A * | 4/1996 | Roy | A23L 7/117 426/439 |
| 5,802,959 | A * | 9/1998 | Benson | A47J 37/044 126/21 A |
| 2009/0208621 | A1 * | 8/2009 | Dotan | A47J 37/1214 426/389 |
| 2010/0119659 | A1 * | 5/2010 | Ovadia | A23L 1/0128 426/92 |
| 2010/0269710 | A1 * | 10/2010 | Kobayashi | A47J 37/1228 99/348 |
| 2013/0202756 | A1 * | 8/2013 | Barber | A23L 1/0107 426/438 |
| 2014/0030405 | A1 * | 1/2014 | Spurr | A47J 37/1214 426/438 |

FOREIGN PATENT DOCUMENTS

| | | |
|---|---|---|
| JP | 2001-314319 A | 11/2001 |
| JP | 2001-327409 A | 11/2001 |
| JP | 2002-112896 A | 4/2002 |
| JP | 2010-239866 A | 10/2010 |

* cited by examiner

CONTINUOUS FOOD FRYING DEVICE, CONTINUOUS FOOD FRYING METHOD, AND METHOD FOR PRODUCING FRIED FOOD

TECHNICAL FIELD

The present invention relates to a continuous food frying device and a continuous food frying method which are used for producing fried rice, pilaf, fried noodle, and fried vegetable, and the like and a method for producing these fried foods.

BACKGROUND ART

Conventionally, there have been known continuous food frying devices for continuously frying food, while heating and mixing the food in a string-like state, a powdery state, a grain-like state or being cut in a heated cylindrical drum.

The conventional continuous food frying devices include a device described in Patent Literature 1, for example. The continuous food frying device described in Patent Literature 1 includes a cylindrical drum which is rotatably supported for heating food, and a food scooping member moving along an inner circumference of the cylindrical drum. According to the technique described in the Patent Literature 1, the food scooping member moves along the inner circumference of the cylindrical drum to scoop and drop the food, so as to mix the food.

CITATION LIST

Patent Literature

PTL 1: Japanese Patent Laid-Open No. 2001-327409

SUMMARY OF INVENTION

Technical Problem

However, according to the technique described in the Patent Literature 1, since an entire cylindrical drum except for both ends in an axial direction of the cylindrical drum is closed with a wall surface, steam generated from the food has been hardly discharged when the food is heated in the cylindrical drum. Therefore, according to the steam generated from the food, there has been a problem that humidity inside the cylindrical drum increases, and excess moisture is attached onto a surface of the food, and thereby texture of the produced food is deteriorated.

A purpose of the present invention is to provide, in consideration of the case of the above-described conventional technique, a continuous food frying device and a continuous food frying method capable of improving the texture of the produced food and a method for producing fried foods.

Solution to Problem

To solve the above-described problem and achieve an object of the present invention, the continuous food frying device of the present invention includes a first heating unit, a conveyance unit, a uniformizing unit, and a second heating unit. The first heating unit includes a hollow, substantially cylindrical drum member with its both axial ends open, and a heating section for heating the drum member. Further, the first heating unit stirs and heats the food charged therein from a charging port located at an axial end of the drum member. The conveyance unit conveys the food discharged from a discharging port located at the other axial end of the drum member. The uniformizing unit places the food discharged from the first heating unit on the conveyance unit so as to make a thickness of the food substantially uniform, or to uniformize the thickness substantially uniform on the conveyance unit. The second heating unit includes injection ports to inject hot air. The second heating unit blows the hot air from the injection ports onto the food conveyed by the conveyance unit.

Further, the conveyance unit may include an endless belt member extending from the first heating unit to the second heating unit, and a support roller rotatably supporting the belt member. The belt member may have provided therein a plurality of ventilation holes through which the hot air injected from the injection ports passes. According to such a configuration, a moisture removing effect by the second heating unit can be improved.

Further, a seasoning charging unit may be arranged between the first heating unit and the second heating unit so as to charge seasoning into the food conveyed by the conveyance unit. According to the configuration described above, the seasoning is intentionally browned by the second heating unit so as to apply spicy flavor of the browned seasoning to the produced food.

Further, the continuous food frying method of the present invention includes processes described in (1) to (6) below.
(1) A heating process to heat a hollow, substantially cylindrical drum member with its both axial ends open.
(2) A charging process to charge the food from a charging port located at one axial end of the drum member heated by the heating process.
(3) A first heating process to stir and heat the charged food and previously heated oil.
(4) A conveying process to convey the food having finished the first heating process and discharged from the discharging port located at the other axial end of the drum member by the conveyance unit.
(5) A uniformizing process to uniformize a thickness of the food having finished the first heating process substantially uniform on the conveyance unit.
(6) A second heating process to heat the food whose thickness has been made substantially uniform in the uniformizing process by blowing hot air from injection ports onto the food.

Further, another continuous food frying method of the present invention includes processes described in (1) to (6) below.
(1) A heating process to heat a hollow, substantially cylindrical drum member with its both axial ends open.
(2) A charging process to charge the food from a charging port located at one axial end of the drum member heated by the heating process.
(3) A first heating process to stir and heat the charged food and previously heated oil.
(4) A uniformizing process to place the food having finished the first heating process and discharged from a discharging port located at the other axial end of the drum member on a conveyance unit so as to make a thickness of the food substantially uniform.
(5) A conveying process to convey the food whose thickness has been made substantially uniform in the uniformizing process by the conveyance unit.
(6) A second heating process to heat the food conveyed in the conveying process by blowing hot air from injection ports onto the food.

Further, a method for producing fried food according to the present invention is performed described as below. The first heating process charges the food into the heated, hollow, substantially cylindrical drum member with its both axial ends open and also stirs and heats the food and the previously heated oil. Subsequently, after the first heating process has been finished, the uniformizing process places the food on the conveyance unit so as to make a thickness of the food substantially uniform or uniformize the thickness substantially uniform on the conveyance unit. Then, the second heating process heats the food whose thickness has been made substantially uniform in the uniformizing process by blowing the hot air from the injection ports onto the food.

Advantageous Effects of Invention

According to the continuous food frying device, the continuous food frying method, and the method for producing fried food of the above described configuration, by blowing the hot air onto the food by the second heating unit (second heating process), excessive moisture on a surface of the food can be removed, thereby improving the texture of the food.

DESCRIPTION OF EMBODIMENTS

Figure 1:
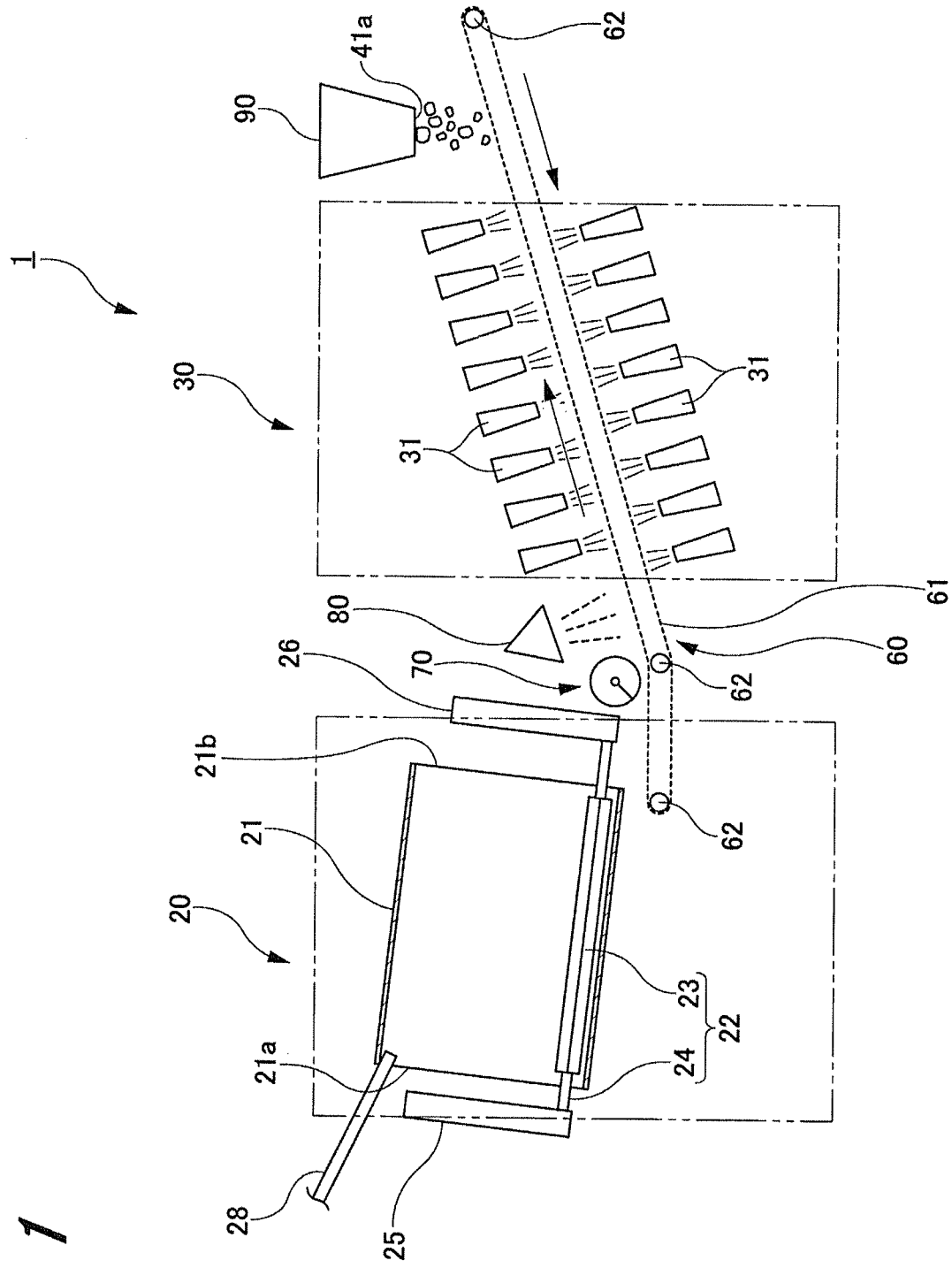
FIG. 1 is a floor layout view illustrating a continuous food frying device according to an embodiment of the present invention.
Figure 2:
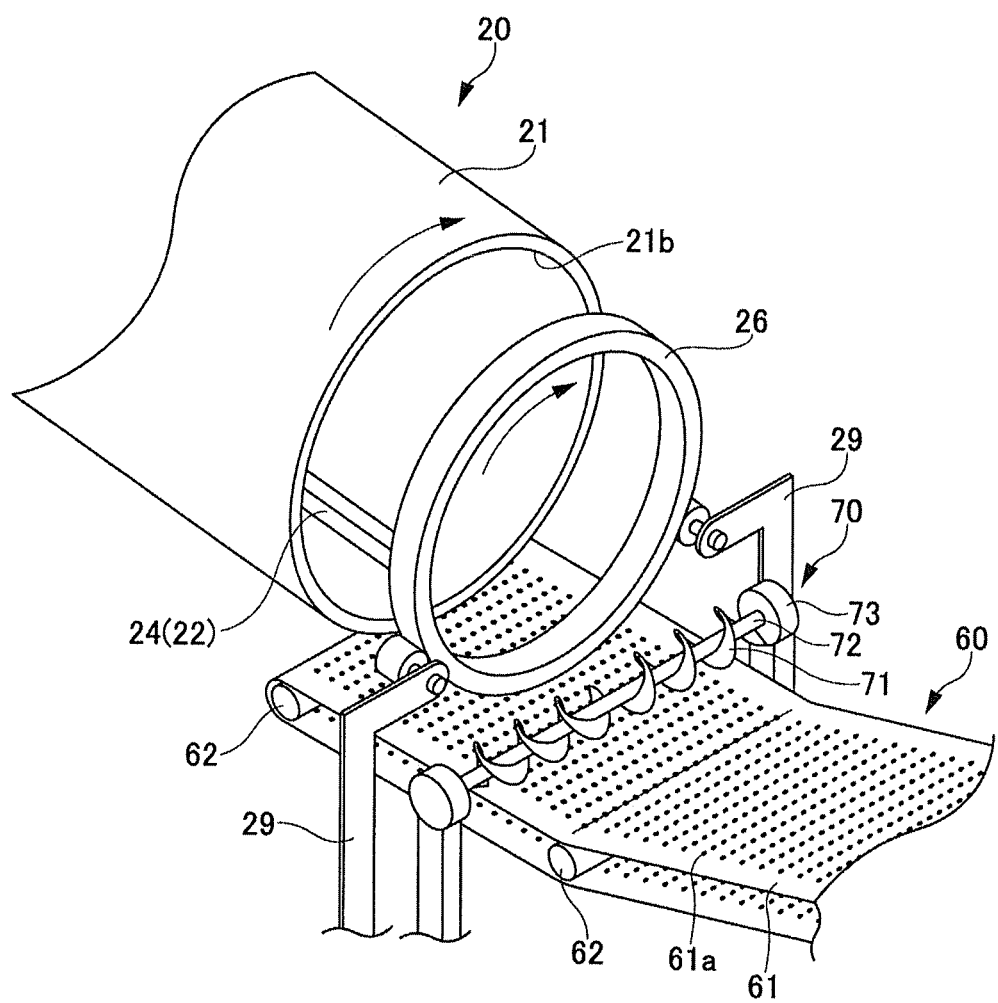
FIG. 2 is a perspective view illustrating a main section of the continuous food frying device according to the embodiment of the present invention.
Figure 3:
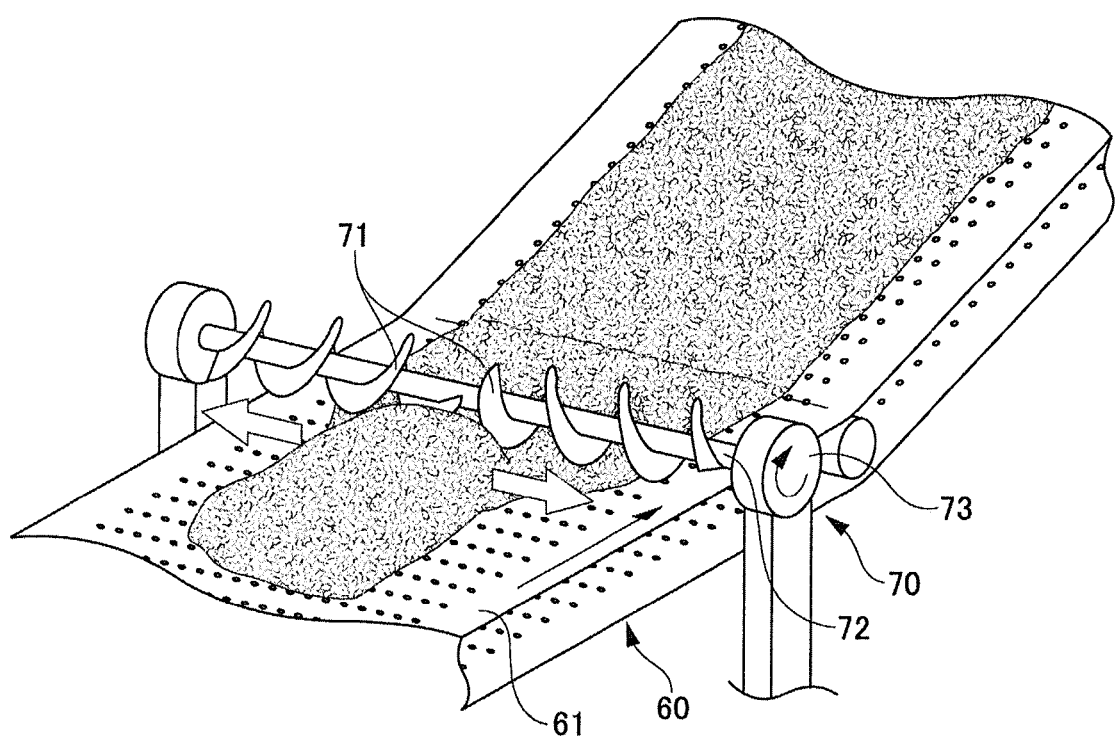
FIG. 3 is a perspective view illustrating a uniformizing unit in the continuous food frying device according to the embodiment of the present invention.

With reference to FIGS. 1 to 3, a continuous food frying device, a continuous food frying method, and a method for producing fried food according to the embodiment of the present invention will be described below. A same reference sign will be applied to a member in common in each drawing.

1. Configuration Example of Continuous Food Frying Device

First, with reference to FIG. 1, a configuration example (hereinafter, referred to as a "present example") of a continuous food frying device will be described.

FIG. 1 is a floor layout view illustrating a continuous food frying device.

A continuous food frying device 1 illustrated in FIG. 1 is a device particularly for producing fried rice or pilaf by frying cooked rice with oil and food material. As illustrated in FIG. 1, the continuous food frying device 1 includes a first heating unit 20, a second heating unit 30, and a conveyance unit 60. Further, a uniformizing unit 70 is provided between the first heating unit 20 and the second heating unit 30.

[First Heating Unit]

First, the first heating unit 20 will be described. The first heating unit 20 mixes and heats the food and pre-heated oil, in other words, is a unit to perform frying processing. The first heating unit 20 includes a drum member 21 into which the food is charged, a stirring member 22 to stir the food, a pair of movable mechanisms 25, 26, and a heating section (not illustrated) to heat a drum member 21.

The drum member 21 is formed in a hollow, substantially cylindrical shape with its both axial ends open. An opening located at one axial end side of the drum member 21 is a charging port 21a through which the food (according to the present example "cooked rice") is charged. An opening located at the other axial end side of the drum member 21 is a discharging port 21b to discharge the food.

Further, a part of a conveyance belt (not illustrated) to convey the food to the first heating unit 20 is inserted into the charging port 21a. Furthermore, at an upper portion of the charging port 21a, a charging section 28 is provided. Via the charging section 28, a liquid member (according to the present example "egg liquid") solidified by heating is charged into a cylindrical hole of the drum member 21.

As the drum member 21, it is preferable to use metal material such as stainless steel, steel material, and copper-based material having excellent thermal conductivity. Further, the drum member 21 preferably has enough thickness for prevention from local scorch and performing uniform heating with no unevenness. Furthermore, an inner circumferential surface of the drum member 21 may be bared surface, or may apply surface processing such as fluorine resin coating, fluorine resin impregnation processing, or thermal spray processing of metal powder.

The drum member 21 is rotatably supported by a support base (not illustrated). The charging port 21a side of the drum member 21 is arranged vertically higher than the discharging port 21b by the support base. In other words, the axial direction of the drum member 21 is inclined with respect to a horizontal direction. Therefore, the food on which frying processing is performed at the drum member 21 is transferred to the discharging port 21b side due to inclination of the drum member 21, and then discharged outside the cylindrical hole from a vertically lower portion of the discharging port 21b. Further, the drum member 21 is rotatably driven by a driving section (not illustrated).

A first movable mechanism 25 is arranged at one axial side of the drum member 21 which is the charging port 21a side, and a second movable mechanism 26 is arranged at the other axial side of the drum member 21 which is the discharging port 21b side. A space between the second movable mechanism 26 and the discharging port 21b is set to be larger than a space between the first movable mechanism 25 and the charging port 21a.

FIG. 2 is a perspective view illustrating a main section of the continuous food frying device.

As illustrated in FIG. 2, the second movable mechanism 26 is formed of a member in a substantially ring shape. The second movable mechanism 26 is rotatably supported by a rotation support member 29. The second movable mechanism 26 is rotatably driven by the drive unit (not illustrated) in a same direction as a rotational direction of the drum member 21. Since a configuration of the first movable mechanism 25 is substantially same as that of the second movable mechanism 26, the description is omitted.

Further, a rotational speed of the first movable mechanism 25 and the second movable mechanism 26 is set to be higher than that of the drum member 21. More specifically, the rotational speed of the first movable mechanism 25 and the second movable mechanism 26 is set to be substantially twice as high as that of the drum member 21. In addition, the rotational speed of the first movable mechanism 25 and the second movable mechanism 26, and the rotational speed of the drum member 21 are not limited to that described above, but, they are appropriately set depending on, for example, an axial length of the drum member 21 and an inclination angle with respect to the horizontal direction.

As illustrated in FIG. 1, the first movable mechanism 25 and the second movable mechanism 26 are provided with the stirring member 22. The stirring member 22 includes a stirring stick 23 and a stirring axis 24. One axial end of the stirring axis 24 is attached to the first movable mechanism 25, and the other axial end is attached to the second movable mechanism 26. The stirring axis 24 passes through along the axial direction in the cylindrical hole of the drum member 21. The stirring axis 24 is arranged so that its axial direction is substantially parallel to the axial direction of the drum member 21.

The stirring stick 23 for stirring the food is provided on the stirring axis 24.

Due to the rotation of the first movable mechanism 25 and the second movable mechanism 26, the stirring stick 23 and the stirring axis 24 of the stirring member 22 move along the inner wall surface of the cylindrical hole of the drum member 21. With the arrangement described above, the food charged into the cylindrical hole of the drum member 21 is scooped up and stirred by the stirring stick 23.

The present embodiment describes the example that the stirring member 22, the first movable mechanism 25, and the second movable mechanism 26 are provided, but, it is not limited thereto. For example, due to provision of a stirring vane protruding inward in a radial direction from the inner wall surface of the drum member 21 which is rotatably driven, the food may be stirred by being scooped up with the stirring vane or only by a rotational action of the drum member 21.

[Conveyance Unit]

Subsequently, a conveyance unit 60 will be described.

As illustrated in FIGS. 1 and 2, the conveyance unit 60 includes an endless belt member 61, and a plurality of support rollers 62 for rotatably supporting the belt member 61. The strip-shaped belt member 61 includes a plurality of ventilation holes 61a. A diameter of the plurality of ventilation holes 61a is set to be smaller than that of the food (according to the present embodiment, "cooked rice"). The belt member 61 extends from a vicinity of the discharging port 21b of the first heating unit 20, passing through the second heating unit 30, up to a charging port 41a of a solid food material charging unit 90 described below. The conveyance unit 60 conveys the food discharged from the first heating unit 20 up to the solid food material charging unit 90, while passing through the second heating unit 30.

The present embodiment describes the example including the plurality of ventilation holes 61a provided at the belt member 61, but, it is not limited thereto. A belt member may be formed of net-formed member having a mesh smaller than the food by lapping over linear members.

[Uniformizing Unit]

Subsequently, the uniformizing unit 70 will be described. As illustrated in FIG. 2, the uniformizing unit 70 is arranged at the vicinity of the discharging port 21b of the first heating unit 20 and above a vertical direction of the conveyance unit 60. The uniformizing unit 70 is a member which spreads, thinly and substantially uniformly, the food discharged from the discharging port 21b of the first heating unit 20 on the belt member 61 of the conveyance unit 60.

FIG. 3 is a perspective view of the uniformizing unit 70 when viewed from an upper stream side of the conveyance direction of the food.

As illustrated in FIGS. 2 and 3, the uniformizing unit 70 includes a uniformized piece 71, a rotating shaft 72, a rotational driving unit 73 for rotating and driving the rotating shaft 72. The uniformized piece 71 is formed to protrude outward in the radial direction from a side surface portion of the rotating shaft 72 spirally along the axial direction of the rotating shaft 72. Further, the winding direction of the uniformized piece 71 is opposite between the one side and the other side in the axial direction as boundary at an intermediate portion of the rotating shaft 72 in the axial direction.

When the rotating shaft 72 is rotated by the rotational driving unit 73, the uniformized piece 71 is also rotated together with the rotating shaft 72. Herein, the food discharged from the discharging port 21b of the first heating unit 20 is placed at a substantially center of the belt member 61 in a width direction. The rotationally driven uniformized piece 71 breaks a mass of the food placed on the substantially center of the belt member 61 and spreads it in such a manner to transfer the food to both sides of the belt member 61 in the width direction. With this arrangement, a thickness of the food discharged from the discharging port 21b of the first heating unit 20 and placed on the belt member 61 of the conveyance unit 60 can be made substantially uniform.

The present embodiment describes the example where the uniformized piece 71 is wound spirally on the rotating shaft 72, but, it is not limited thereto. For example, the uniformized piece comprised of a plurality of feather members may be fixed with intervals along the axial direction of the rotating shaft.

Further, the present embodiment describes the uniformizing unit 70 which rotationally drives the uniformized piece 71, but, the present invention is not limited thereto. As the uniformizing unit, for example, between the discharging port 21b of the drum member 21 and the conveyance unit 60, a shooter to discharge the food and a rotator to spread the food in the shooter may be provided.

Further, as another example of the uniformizing unit, between the discharging port 21b of the drum member 21 and the conveyance unit 60, a conveyer which is orthogonal to the conveyance direction so as to reciprocate substantially horizontally in a predetermined length may be provided. In the example described above, the conveyer reciprocates at a high speed so as to make the thickness of the food placed on the conveyance unit 60 practically same.

Further, as another example of the uniformizing unit, between the discharging port 21b of the drum member 21 and the conveyance unit 60, a vibration shooter to discharge the food and to vibrate may be provided. According to the example described above, the vibration shooter vibrates so as to make the thickness of the food placed on the conveyance unit 60 substantially uniform.

The uniformizing unit may adopt various types of methods other than that described above.

[Seasoning Charging Unit]

As illustrated in FIG. 1, a seasoning charging unit 80 is provided between the uniformizing unit 70 and the second heating unit 30. The seasoning charging unit 80 is a unit to charge seasoning (according to the present embodiment, "soy source", for example) to the food uniformized on the belt member 61 of the conveyance unit 60 by the uniformizing unit 70.

[Second Heating Unit]

Subsequently, the second heating unit 30 will be described.

The second heating unit 30 is a unit to blow the hot air onto the food conveyed by the conveyance unit 60 and the seasoning charged from the seasoning charging unit 80 so as to heat them and remove excessive moisture on a surface of the food. The second heating unit 30 includes a plurality of injection ports 31 and a fan (not illustrated) for supplying the hot air to the injection ports 31. The hot air is blown from the plurality of injection ports 31. Further, humidity of the hot air blown from the plurality of injection ports 31, for example, may be set to be lower than that in the cylindrical hole of the drum member 21, during the heating process performed on the food in the first heating unit 20. The humidity is appropriately set according to a purpose.

The plurality of injection ports 31 is arranged to face a placing surface of the belt member 61 on which the food is placed. According to the present embodiment, a plurality of the injection ports 31 is arranged to hold the belt member 61 from an upper portion and a lower portion in the vertical direction.

The second heating unit 30 blows the hot air from the injection ports 31 onto the food placed on the belt member 61.

Further, the hot air at 250° C., for example, is blown at a wind speed 5 m/s from the injection ports 31. A temperature and the wind speed of the hot air blown from the injection ports are appropriately set. Furthermore, by adjusting the temperature and the wind speed of the hot air blown from the injection ports 31, an amount of moisture on the surface of the food can be easily adjusted.

The present embodiment describes the example that the injection ports 31 are arranged so as to blow the hot air to both an upper portion and a lower portion of the belt member 61 in the vertical direction, but it is not limited thereto. For example, the injection ports 31 may be arranged only at an upper portion or a lower portion of the belt member 61 in the vertical direction. Alternatively, the injection ports 31 may be arranged for blowing the hot air in one vertical direction of the belt member 61 and, in the other direction thereof, an absorbing section to absorb the hot air may be provided.

With this arrangement, the food can be heated only at one side in the vertical direction. Therefore, one side of the seasoning liquid attached on the food or only at one side of the food can be scorched, and thus other portions of the food can be avoid from being scorched. Further, when the hot air passes through a gap of the food, since the excessive moisture attached on the surface of the food evaporates due to the hot air passing through the food, the humidity of the hot air after passing through the food is higher than that before passing through the food. By absorbing the hot air with increasing humidity at the absorbing section, the excessive moisture can be prevented from attaching to the food again.

[Solid Food Material Charging Unit]

Further, a solid food material charging unit 90 is provided at an opposite side of the first heating unit 20 in the second heating unit 30, in other words, at a downstream side of the second heating unit 30. The solid food material charging unit 90 is heated by the second heating unit 30 and charges solid food material (according to the present embodiment, for example, "grilled pork" or "bacon") onto the food placed on the belt member 61 of the conveyance unit 60 from the charging port 41*a*.

The present embodiment describes the example that the solid food material is charged after the second heating unit 30, but, it is not limited thereto. In the case that the solid food material does not need to be charged, the solid food material charging unit may not be provided.

Further, the present embodiment describes the example that the continuous food frying device is used for the device for producing the fried rice or the pilaf, but, it is not limited thereto. For example, the continuous food frying device may be used as the device for producing various types of fried foods such as fried noodle and fried vegetable.

2. Continuous Food Frying Method

Subsequently, the continuous food frying method using the continuous food frying device 1 having the above-described configuration will be described. The present embodiment will describe an example of producing the fried rice as food to be produced.

First, the cooked rice is produced by a rice cooking unit (not illustrated). The methods for producing the cooked rice include a rice cooking method by rice cooking pot and a rice steaming and boiling method that boils the steamed rice. Subsequently, the cooked rice is conveyed to the first heating unit 20. The cooked rice conveyed to the first heating unit 20 is charged into the cylindrical hole of the drum member 21 from the charging port 21*a* (charging process). The drum member 21 is previously heated to 250° C., for example, by the heating unit. Further, the oil is previously charged into the cylindrical hole of the drum member 21 and the charged oil is also heated.

Subsequently, due to driving the driving section (not illustrated), the drum member 21 and the stirring member 22 are rotated. With this arrangement, the cooked rice charged into the cylindrical hole of the drum member 21 is heated with the heated oil and the inner circumferential surface of the drum member 21, and then stirred by the stirring member 22. In other words, the cooked rice is fried by the first heating unit 20 (first heating process). Before the cooked rice is charged into, the drum member 21 and the stirring member 22 may be rotated.

Since the drum member 21 and the oil are previously heated, the surface of the cooked rice charged into the drum member 21 is fried to be hardened. With this arrangement, a coating layer is formed on the surface of the cooked rice to suppress the oil from seeping into an inside of the cooked rice and the moisture from seeping out to an outside thereof.

Further, when the cooked rice is charged into the cylindrical hole of the drum member 21, the egg liquid is charged from the charging unit 28 into the cylindrical hole of the drum member 21. At this point, it is preferable that, at a timing when the charged egg liquid is solidified by heating to some extent, the egg liquid is mixed with the cooked rice. With this arrangement, the coating layer of the egg can be formed on the surface of the cooked rice.

Herein, the axial direction of the drum member 21 is inclined with respect to the horizontal direction, and a height of the discharging port 21*b* is set to be lower than that of the charging port 21*a* in the vertical direction. Therefore, the cooked rice that has been scooped and dropped repeatedly is transferred toward the discharging port 21*b* due to the inclination of the drum member 21. The fried cooked rice is discharged from the discharging port 21*b* and discharged onto the belt member 61 of the conveyance unit 60 from between the drum member 21 and the second movable mechanism 26.

Subsequently, by driving the conveyance unit 60, the fried cooked rice is conveyed to the uniformizing unit 70, the seasoning charging unit 80, and the second heating unit 30 (conveying process). As illustrated in FIGS. 2 and 3, the rotating shaft 72 and the uniformized piece 71 of the uniformizing unit 70 are rotated. With this arrangement, the fried cooked rice is spread on the belt member 61, and the thickness of the fried cooked rice is made substantially uniform (uniformizing process).

Subsequently, from above the belt member 61 toward the cooked rice, the seasoning is charged from the seasoning charging unit 80. Since the cooked rice is fried by the first heating unit 20, the surface of the cooked rice is coated with the oil and the egg, and the coating layer is formed by hardening the cooked rice. With the hardening of the cooked rice, the excessive seasoning can be suppressed from seeping into the inside of the cooked rice. In other words, deterioration of the texture caused by seasoning seeping into the inside of the cooked rice more than required can be prevented.

Subsequently, the hot air injects from the injection ports 31 of the second heating unit 30. The hot air is blown onto the cooked rice into which the seasoning is charged from the injection ports 31 so as to heat the cooked rice (second heating process). By blowing the hot air onto the heated cooked rice in the first heating process, the excessive moisture on the surface of the cooked rice can be blown away. With this arrangement, the moisture attached on the surface of the cooked rice in the first heating process can be removed, and thereby improvement of the texture can be realized.

Further, as described above, in the first heating process by the first heating unit 20, by coating the surface of the cooked rice with the oil, as a result, the surface of the cooked rice is hardened so as to confine the moisture necessary for the inside of the cooked rice and prevents the moisture from seeping outside. As described above, by separating the heating process, the amount of the moisture on the surface of the cooked rice is differentiated from that inside the cooked rice. Furthermore, according to the present embodiment, the surface of the cooked rice is dried to obtain the light dry texture, and also inside of the cooked rice becomes puffy.

The belt member 61 is provided with a plurality of ventilation holes 61a. The hot air injected from the injection ports 31 passes via the plurality of ventilation holes 61a. With this arrangement, the hot air can be blown from both upper and lower directions onto the cooked rice, as a result, comparing with a case where the ventilation holes 61a are not provided, the moisture removing effect can be improved.

Further, before the second heating process by the second heating unit 30 is performed, the uniformizing unit 70 is provided on the belt member 61 to uniformize thinly the thickness of cooked rice substantially uniform. With this arrangement, the hot air can be blown onto each one grain of the cooked rice placed on the belt member 61 so as to reduce uneven heating.

According to the present embodiment, after the seasoning is charged, the cooked rice is heated by the second heating unit 30. Thus, by adjusting the temperature and the wind speed of the hot air injected from the injection ports 31, the seasoning can be intentionally scorched. With this arrangement, fragrant flavor of scorched seasoning can be applied to the produced food.

Herein, when the seasoning is charged into the drum as the conventional technique described in the Patent Literature 1, the seasoning may be attached onto the inner wall of the drum and the seasoning may be scorched and adhered on the inner wall of the drum. When the seasoning has been scorched and adhered on the inner wall of the drum, it was necessary to stop a production line temporarily to clean the drum.

On the other hand, according to the present embodiment, by charging the seasoning to the cooked rice from above the belt member 61, the seasoning can be suppressed from adhering onto the belt member 61. Therefore, when the second heating process is performed in the second heating unit 30, this makes it possible to suppress the seasoning from being scorched and adhering onto the belt member 61.

Further, according to the present embodiment, the conveyance unit 60 includes an endless belt member 61. Therefore, a cleaning device for cleaning the belt member 61 can be arranged at a lower side of the belt member 61 in the vertical direction, in other words, on a surface (the surface returning from the solid food material charging unit to the first heating unit 20) where the food has been finished to convey. Therefore, without temporarily stopping the production line, while cleaning the seasoning and the cooked rice adhering onto the belt member 61, the food can be produced. As a result, a production capacity of the continuous food frying device 1 can be improved.

Conventionally, to decrease the humidity inside the drum member 21, methods have been considered for blowing the hot air into the drum member 21, or removing steam therein. However, in the case that such methods are used for producing the fried rice, it is necessary to increase the temperature of the drum member 21 to heat and solidify the egg liquid. Thus, since the temperature of the drum member 21 becomes high with the humidity decreasing, the food is easily burned and stuck on the drum member 21.

On the other hand, according to the present embodiment, the excessive moisture on the surface of the cooked rice is removed by the second heating unit 30 so that it becomes unnecessary to consider the humidity inside the drum member 21 in the first heating unit 20. With this arrangement, even if the temperature of the drum member 21 increases to heat and solidify the egg liquid, the humidity in the drum member 21 does not decrease more than required. Compared with a case that the humidity decreases, the food can be suppressed from being burned and stuck.

The process for heating the cooked rice is separated into the first heating unit 20 using the drum member 21 and the second heating unit 30 using the hot air so as to reduce time for heating the food in the drum member 21 of the first heating unit 20 using the drum member 21. With this arrangement, the amount of the cooked rice adhering onto the inner wall surface of the drum member 21 and the stirring member 22 can be reduced. Therefore, the number of times to temporarily stop the production line to clean the inner wall surface of the drum member 21 and the stirring member 22 can be reduced so as to improve the production capacity of the continuous food frying device 1.

Subsequently, when the second heating process by the second heating unit 30 is finished, the cooked rice is conveyed to the solid food material charging unit 90. The grilled pork is charged into the cooked rice from the solid food material charging unit 90. The cooked rice and the grilled pork are mixed with each other by the mixing unit (not illustrated). The mixed cooked rice and grilled pork are frozen by a freezing unit (not illustrated). With this arrangement, a continuous food frying operation by the continuous food frying device 1 according to the present embodiment is completed.

In the case that the freezing processing on the food is not necessary, the continuous food frying operation may be completed upon completing the mixing process by the mixing unit.

The embodiments of the continuous food frying device and the continuous food frying method including an operational effect are described as above. However, the continuous food frying device and the continuous food frying method are not limited to the embodiments described above, but, various modifications can be implemented within a scope that does not depart from the scope of the present invention described in the claims of the patent.

REFERENCE SIGNS LIST 1 continuous food frying device
20 first heating unit 21 drum member
21a charging port
21b discharging port
22 stirring member
23 stirring stick
24 stirring axis
25 first movable mechanism
26 second movable mechanism
28 charging section
30 second heating unit
31 injection ports
60 conveyance unit
61 belt member
61a ventilation hole
62 support roller
70 uniformizing unit
71 uniformized piece
72 rotating shaft
73 rotation driving section
80 seasoning charging unit
90 solid food material charging unit

The invention claimed is:

1. A continuous food stir-frying device, comprising:
a first heating unit that includes a hollow, substantially cylindrical drum member with both axial ends open, and a heating section for heating the drum member, wherein the first heating unit stirs and heats food charged therein from a charging port located at one axial end of the drum member,
a conveyance unit that conveys the food discharged from a discharging port located at the other axial end of the drum member;
a uniformizing unit that moves the food discharged from the first heating unit and that is on the conveyance unit so as to make a thickness of the food substantially uniform, or makes the thickness of the food substantially uniform on the conveyance unit, and
a second heating unit that includes injection ports to inject hot air, and blows the hot air from the injection ports onto the food conveyed by the conveyance unit,
wherein an axial direction of the drum member is inclined with respect to a horizontal plane so that the charging port is arranged vertically higher than the discharging port, and
wherein in the first heating unit, the cylindrical drum member rotates about an axis.

2. The continuous food stir-frying device according to claim 1, wherein the first heating unit includes a stirring member to stir the food.

3. The continuous food stir-frying device according to claim 2, wherein
the conveyance unit includes:
an endless belt member extending from the first heating unit to the second heating unit, and
a support roller rotatably supporting the belt member.

4. The continuous food stir-frying device according to claim 3, further comprising:
a seasoning charging unit arranged between the first heating unit and the second heating unit so as to charge seasoning into the food conveyed by the conveyance unit.

5. The continuous food stir-frying device according to claim 3, wherein the belt member has provided therein a plurality of ventilation holes through which the hot air injected from the injection ports passes.

6. The continuous food stir-frying device according to claim 5, further comprising:
a seasoning charging unit arranged between the first heating unit and the second heating unit so as to charge seasoning into the food conveyed by the conveyance unit.

7. The continuous food stir-frying device according to claim 2, further comprising:
a seasoning charging unit arranged between the first heating unit and the second heating unit so as to charge seasoning into the food conveyed by the conveyance unit.

8. The continuous food stir-frying device according to claim 1, wherein
the conveyance unit includes:
an endless belt member extending from the first heating unit to the second heating unit, and
a support roller rotatably supporting the belt member.

9. The continuous food stir-frying device according to claim 8, wherein the belt member has provided therein a plurality of ventilation holes through which the hot air injected from the injection ports passes.

10. The continuous food stir-frying device according to claim 9, further comprising:
a seasoning charging unit arranged between the first heating unit and the second heating unit so as to charge seasoning into the food conveyed by the conveyance unit.

11. The continuous food stir-frying device according to claim 8, further comprising:
a seasoning charging unit arranged between the first heating unit and the second heating unit so as to charge seasoning into the food conveyed by the conveyance unit.

12. The continuous food stir-frying device according to claim 1, further comprising:
a seasoning charging unit arranged between the first heating unit and the second heating unit so as to charge seasoning into the food conveyed by the conveyance unit.

13. The continuous food stir-frying device according to claim 1, wherein the uniformizing unit comprises:
a rotating shaft; and
a uniformized piece protruding outward in a radial direction from a side surface of the rotating shaft,
wherein the uniformized piece is spirally formed along an axial direction of the rotating shaft, and a winding direction of the uniformized piece is opposite between one side and the other side in the axial direction as a boundary at an intermediate portion of the rotating shaft in the axial direction.

14. A continuous food stir-frying method, comprising:
a heating process to heat a hollow, substantially cylindrical drum member with both axial ends open;
a charging process to charge food from a charging port located at one axial end of the drum member that is heated by the heating process;
a first heating process to stir and heat the charged food and previously heated oil;
a conveying process to convey the food having finished the first heating process and discharged from a discharging port located at the other axial end of the drum member by a conveyance unit;
a uniformizing process to uniformize a thickness of the food having finished the first heating process so as to make the thickness of the food substantially uniform on the conveyance unit; and a second heating process to heat the food whose thickness has been made substantially uniform in the uniformizing process by blowing hot air from injection ports onto the food, wherein an axial direction of the drum member is inclined with respect to a horizontal plane so that the charging port is arranged vertically higher than the discharging port, and wherein in the first heating process, the cylindrical drum member rotates about an axis.

15. The continuous food stir-frying method according to claim 14, wherein in the uniformizing process, a mass of the food placed on a substantially center of a belt member of the conveyance unit is broken and spread in a manner in which the food is transferred to both sides of the belt member in a width direction.

16. A continuous food stir-frying method, comprising:
a heating process to heat a hollow, substantially cylindrical drum member with both axial ends open;
a charging process to charge food from a charging port located at one axial end of the drum member that is heated by the heating process;
a first heating process to stir and heat the charged food and previously heated oil;
a uniformizing process to move the food having finished the first heating process and discharged from a discharging port located at the other axial end of the drum member and that is on a conveyance unit so as to make a thickness of the food substantially uniform;
a conveying process to convey the food whose thickness has been made substantially uniform in the uniformizing process, by the conveyance unit; and
a second heating process to heat the food conveyed in the conveying process by blowing hot air from injection ports onto the food,
wherein an axial direction of the drum member is inclined with respect to a horizontal plane so that the charging port is arranged vertically higher than the discharging port, and
wherein in the first heating process, the cylindrical drum member rotates about an axis.

17. The continuous food stir-frying method according to claim 16, wherein in the uniformizing process, a mass of the food placed on a substantially center of a belt member of the conveyance unit is broken and spread in a manner in which the food is transferred to both sides of the belt member in a width direction.

18. A method for producing stir-fried food, comprising:
a first heating process to charge food into a heated, hollow, substantially cylindrical drum member with both axial ends open and also stir and heat the food and previously heated oil;
a uniformizing process to, after finishing the first heating process, move the food that is on a conveyance unit so as to make a thickness of the food substantially uniform, or make the thickness of the food substantially uniform on the conveyance unit; and
a second heating process to heat the food whose thickness has been made substantially uniform in the uniformizing process by blowing hot air from injection ports onto the food,
wherein an axial direction of the drum member is inclined with respect to a horizontal plane so that the charging port is arranged vertically higher than the discharging port, and
wherein in the first heating process, the cylindrical drum member rotates about an axis.

19. The method for producing stir-fried food according to claim 18, wherein in the uniformizing process, a mass of the food placed on a substantially center of a belt member of the conveyance unit is broken and spread in a manner in which the food is transferred to both sides of the belt member in a width direction.

* * * * *